Feb. 7, 1939.    F. G. MEDER    2,145,988
LEVEL
Filed Aug. 11, 1937    2 Sheets-Sheet 1
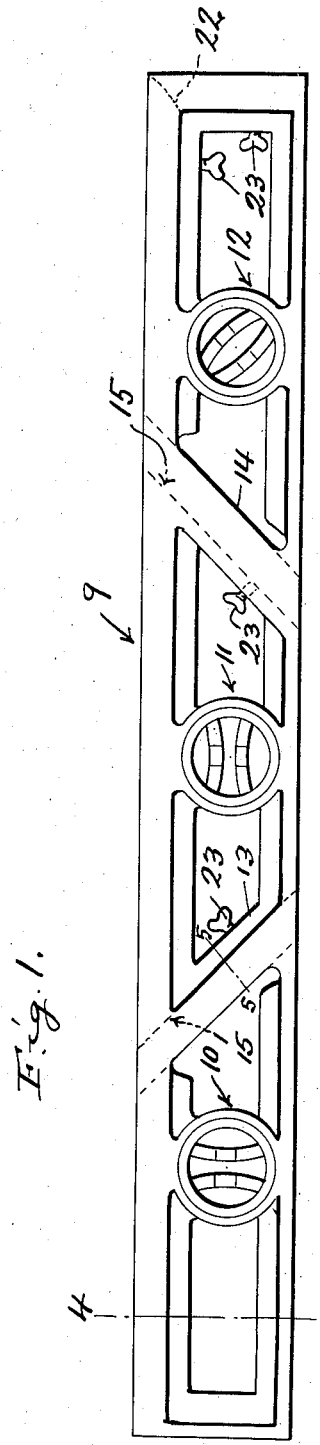
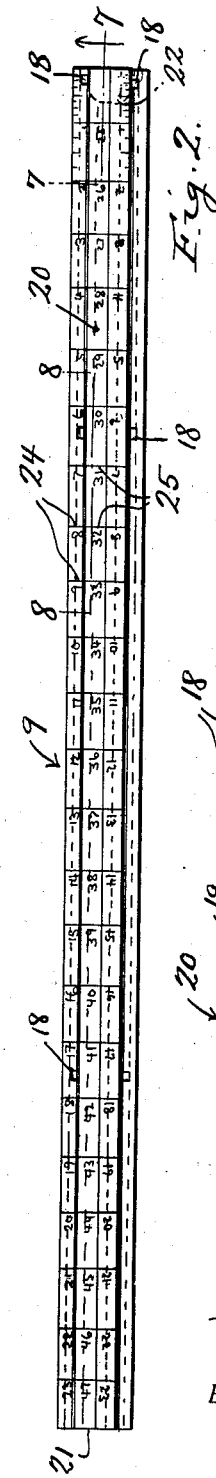
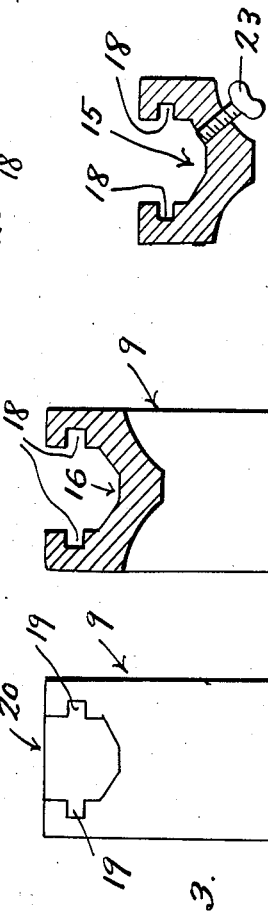
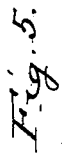
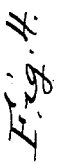
Inventor
*Frederick G. Meder*
By *Clarence A. O'Brien*
*Hyman Berman*
Attorneys Feb. 7, 1939.　　　　　F. G. MEDER　　　　　2,145,988
LEVEL
Filed Aug. 11, 1937　　　　2 Sheets-Sheet 2

Inventor
Frederick G. Meder
By Clarence A. O'Brien
Hyman Berman
Attorneys

Patented Feb. 7, 1939

2,145,988

UNITED STATES PATENT OFFICE 2,145,988

LEVEL

Frederick G. Meder, Tamaqua, Pa.

Application August 11, 1937, Serial No. 158,573

1 Claim. (Cl. 33—88)

This invention relates to an improved level construction characterized, from a standpoint of newness, by the incorporation therein of a multiplicity of features usable essentially in connection with an adjustable calibrated member such as may be conveniently referred to as a measuring and gauge device, the consolidated structure being considered aptly fitted for use by stone and brick masons, carpenters, and other mechanics requiring its two-fold function in planning various jobs and classes of work.

It is admittedly old in the tool and instrument art to utilize supplementary accessories and attachments in connection with so-called spirit levels. Nevertheless, I have found it expedient and practicable to provide an additional and seemingly unique contribution to this particular line of endeavor in the nature of a well directed composite construction, wherein the "level" and measuring and gauging features have been aptly coordinated to facilitate reliable handling and to provide a structure whose range of utility puts it in a class by itself.

Considering the underlying principle of construction, the preferred embodiment is characterized by a multiple channeled frame constituting the body of the level, this having associated therewith a slidable graduated rule susceptible of selective use in connection with the channeled means to enable many and varied tasks to be scientifically planned and laid off for time and temper saving purposes.

Other features and advantages will become more readily apparent from the following description and accompanying drawings.

In the drawings, wherein are utilized like numerals to identify like mechanical details and parts throughout the views:

Figure 1 is a side elevational view of an implement or tool constructed in accordance with the principles of the present inventive conception.

Figure 2 is a top plan view of the device seen in Figure 1.

Figure 3 is an end view, that is, a view observing Figure 1 in a direction from left to right.

Figures 4 and 5 are detail sections on the lines 4—4 and 5—5, respectively, of Figure 1.

Figure 6:
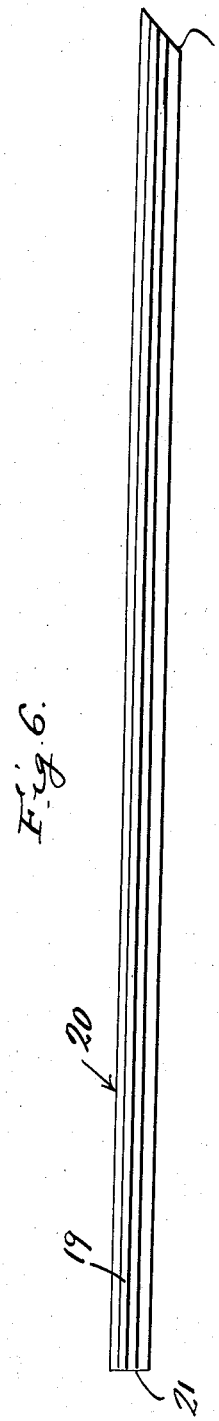

Figure 6 is a detail edge elevational view of the calibrated slide rule.

Figure 8:
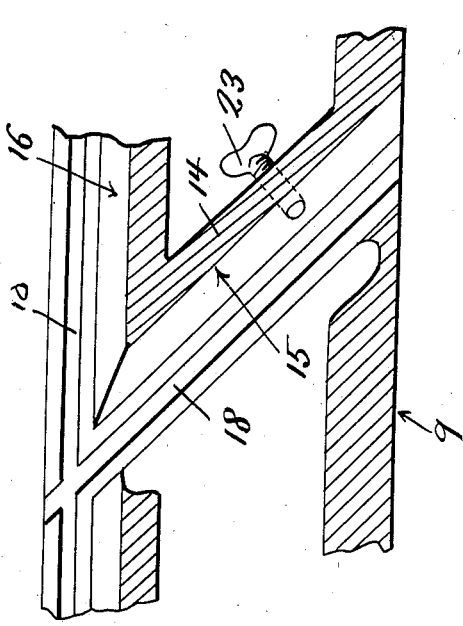
Figure 7:
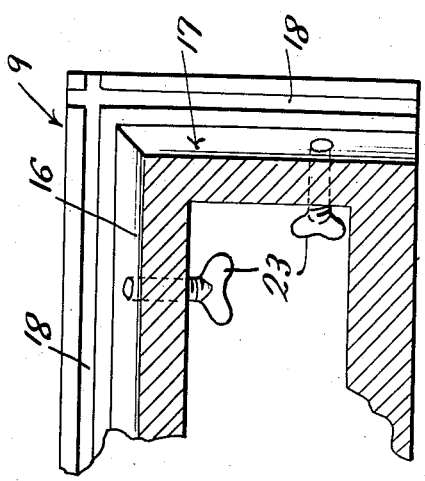

Figures 7 and 8 are fragmentary detail sectional views, enlarged, and taken on the planes of the lines 7—7 and 8—8, respectively, of Figure 2.

The frame forming the body of the level proper is generally denoted by the numeral 9. It is preferably cast from aluminum or equivalent light weight metal. It may be said to be of general rectangular form in so far as the longitudinal configuration and dimension are concerned. Located between the longitudinal side bars of the frame, however, are the various level units denoted by the numerals 10, 11, and 12, respectively. Each includes a sight and within the limits of the sight are the conventional spirit levels. The one at the left denoted by the numeral 10 is employed, as is obvious, as a so-called plumb gauge. The central one 11 is the "level" gauge. The one at the right denoted by the numeral 12 is employed for 45 degree mitering and similar purposes. These features 10, 11, and 12 can be considered unique in the present combination only in so far as they coordinate with the additional features now to be described.

Located between the gauges 10 and 12 and disposed on opposite sides of the central leveling gauge 11 are diverging or oblique cross-members 13 and 14. These, as indicated in Figure 6, are formed with channels 15 opening through opposite ends, that is, opening through the longitudinal side bars of the frame 9. At one end these channels 13 intersect the main horizontal channel 16 formed in what may be called the top bar of the level frame. This main channel 16 opens through opposite ends of the frame and at one end it is intersected by a fourth channel 17 which is disposed at right angles thereto. Thus, the channel 17 is at right angles, while the two channels 15 are at oblique angles and are to each other in converging relationship. All of these channels constitute slideways and are provided in opposite side walls with grooves which form keyways 18 for the keying ribs 19 on opposite longitudinal sides of the mitering bar or rule 20. This is a longitudinal metal bar, preferably of suitable tool steel. At one end, that is, at the left, it is cut across at true right angles, as at 21, while the opposite end is beveled or oblique, as at 22. In length it is commensurate with the length of the channeled top bar of the frame, and it is selectively usable in connection with any one of the channel slideways, as is obvious. Then, too, set screws are employed, as indicated at the points 23, or wherever else necessary, to project into the slideways and to fasten the mitering or scale forming rule 20 in a fixed or predetermined position.

In practice it has ben found expedient and practicable to calibrate the surfaces of the frame 9 and ruler 20, as shown in Figure 2. The calibrations or graduations 24 on the frame are provided on one side of the channel, while those on the rule are suitably grouped and consecutively arranged as denoted by the numeral 25. As a general proposition, the level is 2 feet long and the ruler is an additional 2 feet, whereby to permit the two to coordinate in taking care of most jobs, especially carpentry work, such as would fall within this range of measurements.

To persons skilled in the art to which the invention relates it is obvious that this double functioning measuring level can be used to advantage by projecting the same from one end of the main channel to be employed as an extensible ruler. In this relationship the parts may serve adequately to level across two joists, beams, or rafters, or other adjacent parallel timbers. Likewise, it is possible to not only measure the distance between the parts, but to determine the alignment from a standpoint of horizontal and perpendicular relative positions. Moreover, this same ruler can be placed at right angles to the level by inserting it in the right hand channel, after which it can be locked in place by the set screw. In this position it can be used to get the pitch of a rafter or the inclination of a roof, or for other obvious purposes. Furthermore, the same ruler can be withdrawn from either the end or main longitudinal channels and used selectively with either of the two diagonal bars 13 or 14, in which position the level may be used as a straight edge and the ruler as a guide in marking work for mitering cuts. I merely give these three illustrations of useful purposes, since it is obvious that the device with the parts properly associated may be employed along many and diversified lines.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

As a component part of a combination construction of the class described, a planning and indicating level comprising a frame including a pair of spaced parallel bars and interconnecting transverse end bars, intermediate converging transverse cross-bar formations between the central portions of the parallel bars, one of said parallel bars having a channel opening through opposite ends and extending the full length of the last-named bar, one of said end bars having a channel opening through its opposite ends and communicating with said first-named channel, said intermediate bars being further formed with channels intersecting the first-named channel at oblique angles thereto and arranged in converging relation to each other, all of said channels being adapted for the slidable reception of a common calibrated rule, said rule being of a size and shape to be completely housed in said channel in the parallel bar and a plurality of spirit levels mounted between the parallel bars of the frame, one of said spirit levels being located centrally between the intermediate channeled cross-bars and other end spirit levels, each located between a transverse end bar and a cross bar.

FREDERICK G. MEDER.